UNITED STATES PATENT OFFICE.

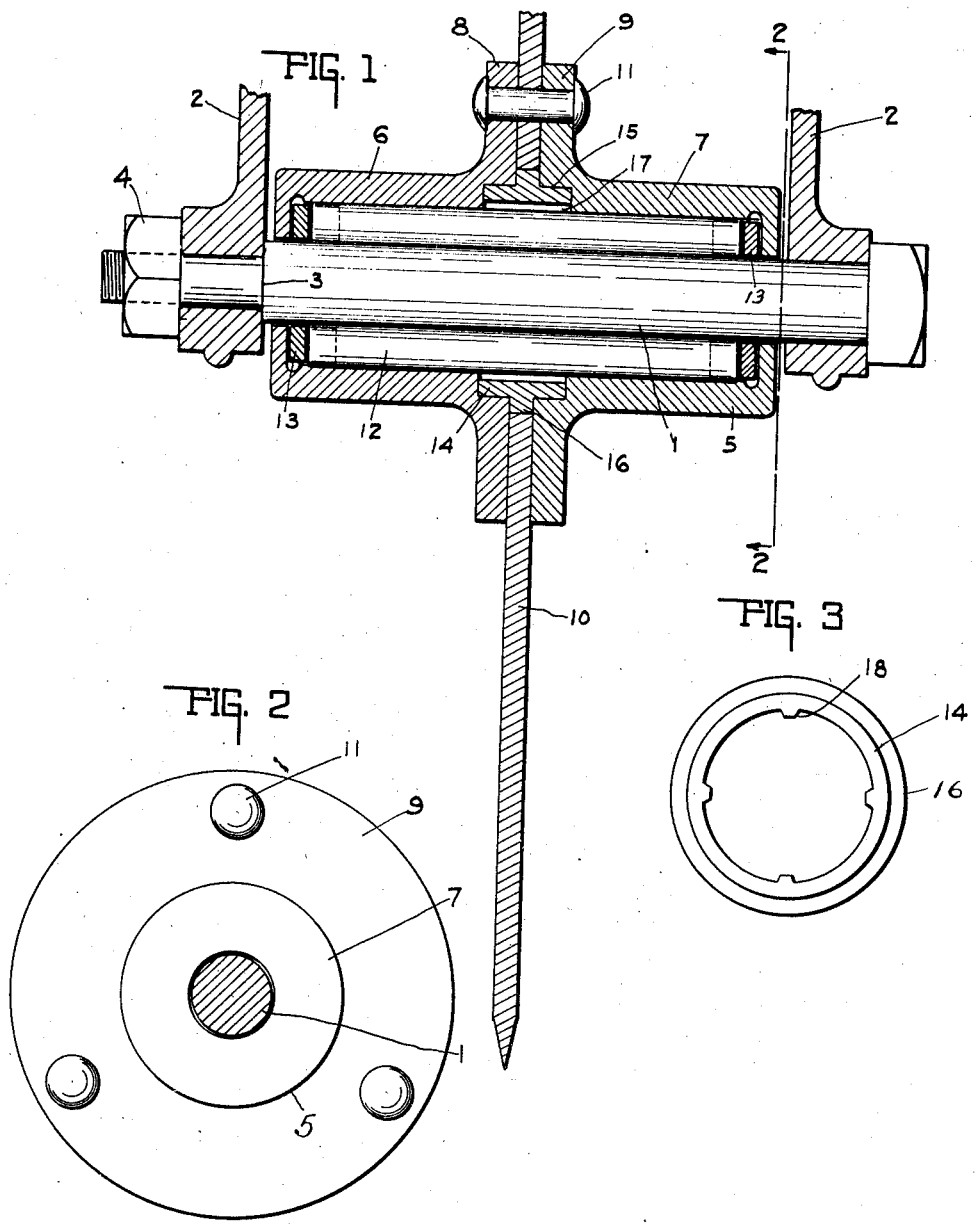

WILLIAM R. WILSON, OF TERRE HAUTE, INDIANA.

ROLLING-DISK-COLTER HUB.

1,340,693.  Specification of Letters Patent.  Patented May 18, 1920.

Application filed January 15, 1919. Serial No. 271,227.

*To all whom it may concern:*

Be it known that I, WILLIAM R. WILSON, a citizen of the United States, and a resident of Terre Haute, county of Vigo, and State of Indiana, have invented a certain new and useful Rolling-Disk-Colter Hub; and I do hereby declare that the following is a full, clear, and exact description thereof, reference being had to the accompanying drawings, in which like numerals refer to like parts.

This invention relates to rolling disk colter hubs, and the prime feature of the invention is the provision of a hub for attachment with a colter, in which are placed bearing rollers.

A further feature of the invention is in so constructing the parts of the hub that they can be very cheaply produced and readily applied to use.

A further feature of the invention is the provision of a coupling for connecting the sections of the hub member, said coupling having means for causing the lubricant within the hub member to be deposited upon the bearing rollers as the hub member rotates.

Other objects and advantages will be more fully set forth in the accompanying specification.

In the accompanying drawings, which are made a part of this application, Figure 1 is a transverse sectional view through a colter showing the hub portion thereof in longitudinal section. Fig. 2 is a sectional view as seen on line 2—2 Fig. 1 and Fig. 3 is an end elevation of the coupling removed from the hub structure.

Referring to the drawings, in which similar numerals designate similar parts throughout the several views, 1 indicates an axle, which in this instance is in the shape of a bolt which projects through the lower ends of a bifurcated yoke 2, the axle 1 having a shoulder 3 adjacent its threaded end which prevents the arms of the yoke from being forced together beyond a certain degree, the axle being held in position by means of a nut 4. Mounted upon the axle 1 is a hub 5, which is formed of substantially cup shaped members 6 and 7, the inner ends of which are provided with radially disposed flanges 8 and 9 respectively between which the colter 10 is positioned, the hub sections being secured to the colter in any suitable manner, as by means of rivets 11. In this manner the hub is entirely closed with the exception of the openings in the ends of the hub through which the axle projects, and consequently the interior of the hub serves as a lubricant chamber.

Between the hub and the axle are positioned a plurality of bearing rollers 12, which are held in proper alinement with the hub and axle and held in spaced relation by means of retainers 13 at each end thereof, said retainers being adjacent the closed ends of the hub. In view of the fact that the two sections of the hub must be in exact alinement with each other, said sections are connected together by means of a coupling 14, the ends of which enter the alining recesses 15 in the meeting ends of the members 6 and 7, the peripheral edge of the coupling having a rib 16 which is of the same width as the width of the colter 10 and closely fits the opening through the colter and passes between the ends of the members 6 and 7. Consequently when the coupling is entered in the recess of one of the members of the hub, the introduction of the other member of the hub over the opposite end of the coupling will bring said members in true alinement with each other.

The diameter of the interior of the coupling 14 is greater than the interior diameter of the cup shaped members 6 and 7, thereby providing a lubricant receiving channel 17 into which the lubricant will gather when the colter is standing idle, and in order to cause said lubricant, or a portion thereof, to leave the channel and pass on to the bearing rollers as the colter starts to rotate, a plurality of ribs 18 are formed on the interior of the coupling, and said ribs are so arranged that they will come substantially flush with the interior of the hub, and in view of the fact that the colter rotates slowly a portion of the lubricant within the channel will be carried upwardly by the ribs and caused to descend on to the bearing rollers and by successively depositing the lubricant upon the bearing rollers as the hub rotates, all parts of said rollers will be properly lubricated.

This device as shown and described is used in connection with a revolving colter, but it will be clearly understood that the hub structure may be used in connection with any rotating member which revolves slowly, and it is to be understood that the invention is not to be limited to the showing made in the drawings.

The parts of the hub may be very easily and cheaply constructed as the two sections are cast, and that portion thereof forming the bearing for the bearing rollers and for the reception of the collar are drilled in order to provide a smooth surface, and the drilling of the interior of the hub and for the recess at one end thereof may be accomplished at the same time.

In assembling the hub structure upon the colter, one end of the coupling is entered in the recess of one of the hub members and the colter then introduced around the rib on the coupling, after which the bearing rollers and one of the retaining members are introduced through the collar and the hub member attached thereto, when the remaining hub member may be introduced over the ends of the bearing rollers and the other retaining member and the projecting end of the coupling entered into the recess in the hub member. The flanged portions of the hub members are then secured by introducing rivets or any other suitable devices through registering openings in the flanges and the colter. The assembled hub member and colter are then introduced between the forked ends of the yoke and axle, introduced through the ends of the yoke and between the bearing rollers in the hub.

This gives an extremely strong and durable structure and one that can be produced at a very nominal expense, and one that will wear indefinitely. It will furthermore be seen that by providing the bearing rollers, and by keeping the same properly lubricated, the friction or drag of the colter will be entirely eliminated as the colter will very readily rotate on its axle.

The invention claimed is:

1. A hub structure, including a pair of hollow members having recesses at their meeting ends, a coupling adapted to fit in said recesses and alining the hub members, an axle extending through said hub structure, and means on the coupling member for distributing lubricant over said axle.

2. A hub structure, including a pair of substantially cup shaped members having flanges at their meeting ends, a coupling for alining said cup shaped members with each other, the interior diameter of said coupling being greater than the interior diameter of the cup shaped members for forming a lubricant chamber, and means carried by the coupling for distributing said lubricant.

3. A hub structure, including a pair of hollow hub members, a coupling for holding said members in alinement with each other, a plurality of bearing rollers in said hub, and ribs on said coupling for distributing lubricant over said bearing rollers when the hub rotates.

4. A hub structure including a pair of hollow members having recesses at their meeting ends, an axle extending through said hollow members, and a coupling member adapted to fit in said recesses and connect said hollow members for alining them on said axle.

5. A hub structure, including a pair of substantially cup shaped members having flanges at their meeting ends, a coupling for alining said cup shaped members with each other, the interior diameter of said coupling being greater than the interior diameter of the cup shaped member for forming a lubricant chamber and means for securing said flanges together for forming a solid hub structure.

In witness whereof I have hereunto affixed my signature.

WILLIAM R. WILSON.

Witnesses:
 JNO. H. SWANDER,
 CHAS. W. GAMMON.